US012510572B2

(12) United States Patent
Teboulle et al.

(10) Patent No.: US 12,510,572 B2
(45) Date of Patent: Dec. 30, 2025

(54) ELECTRICITY METER ARRANGED TO DETECT FRAUDULENT OPENING

(71) Applicant: SAGEMCOM ENERGY & TELECOM SAS, Rueil Malmaison (FR)

(72) Inventors: Henri Teboulle, Rueil Malmaison (FR); Christophe Grincourt, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 132 days.

(21) Appl. No.: 18/189,534

(22) Filed: Mar. 24, 2023

(65) Prior Publication Data

US 2023/0305044 A1 Sep. 28, 2023

(30) Foreign Application Priority Data

Mar. 24, 2022 (FR) .................................. FR2202631

(51) Int. Cl.
*G01R 22/06* (2006.01)
*G08B 13/24* (2006.01)
*H02J 7/34* (2006.01)

(52) U.S. Cl.
CPC ....... *G01R 22/066* (2013.01); *G08B 13/2497* (2013.01); *H02J 7/345* (2013.01)

(58) Field of Classification Search
CPC .. G01R 22/066; G01R 11/24; G08B 13/2497; H02J 7/345; H02J 7/0068
See application file for complete search history.

(56) References Cited

U.S. PATENT DOCUMENTS

| 11,258,299 | B1* | 2/2022 | Busekrus ......... H02J 13/00036 |
| 11,847,507 | B1* | 12/2023 | Borkovic ............... G06F 9/522 |
| 2005/0039040 | A1 | 2/2005 | Ransom et al. |
| 2012/0245869 | A1* | 9/2012 | Ansari ................... G01R 11/24 702/62 |

(Continued)

FOREIGN PATENT DOCUMENTS

| CN | 202119820 U | 1/2012 |
| CN | 104237587 B | 12/2018 |
| EP | 2503343 A1 | 9/2012 |

*Primary Examiner* — Lee E Rodak
*Assistant Examiner* — Zannatul Ferdous
(74) *Attorney, Agent, or Firm* — MUNCY, GEISSLER, OLDS & LOWE, P.C.

(57) ABSTRACT

An electricity meter includes a housing including at least one housing element that is normally closed; a supercapacitor and a power supply circuit arranged to act, whenever the electricity meter is put into connection with electric power, to charge the supercapacitor; both a charge-maintaining circuit arranged to act, whenever the meter has been taken out of connection with electric power, to prevent the supercapacitor from discharging so long as the housing element remains closed, and also a discharge circuit arranged to discharge the supercapacitor in the event that the housing element is opened; a processor circuit arranged to act, after the meter is put back into connection with electric power and in the event that the supercapacitor is discharged, to detect that the housing element has been opened since the meter was taken out of connection with electric power.

9 Claims, 2 Drawing Sheets

(56) References Cited

U.S. PATENT DOCUMENTS

| | | | |
|---|---|---|---|
| 2013/0119974 A1* | 5/2013 | Chamarti | G01R 22/066 |
| | | | 324/110 |
| 2020/0309856 A1* | 10/2020 | Teboulle | G01R 22/00 |
| 2020/0343816 A1* | 10/2020 | Wu | H02M 1/083 |
| 2021/0305829 A1* | 9/2021 | Ramirez | H02J 7/35 |
| 2022/0294458 A1* | 9/2022 | Han | H03L 7/093 |

* cited by examiner

ELECTRICITY METER ARRANGED TO DETECT FRAUDULENT OPENING

The invention relates to the field of smart electricity meters.

BACKGROUND OF THE INVENTION

Very conventionally, an electricity meter has a housing comprising a terminal-cover and a hood. In operation, when the meter is installed on client premises, the terminal-cover and the hood are normally closed. They may be opened exceptionally, but normally only by an operator working for the energy distributor.

However, it is possible that a malicious person might try to defraud by opening the housing of the meter and wiring the metered installation upstream from the meter, i.e. on its network side, so that the electricity consumption of the installation is not recorded by the meter.

In the factory, once the meter has been assembled, the hood is sealed to the remainder of the housing, typically by thermoplastic staking. Likewise, once the meter has been installed and connected, the terminal-cover is sealed to the remainder of the housing. The seal enables an operator, when present subsequently in front of the meter, to detect if there has been any fraudulent opening of the terminal-cover or of the hood.

Nevertheless, it would naturally be advantageous to enable the meter itself to act automatically to detect any opening of the terminal-cover or of the hood, i.e. without such detection requiring the presence of an operator. The meter would then send an alarm message to the information system (IS) of the electrical energy distributor, so that if opening is not expected, the distributor can take action against the fraudulent manipulation.

While the meter is electrically powered (i.e. while the meter is connected to electric power), automatic detection can be implemented relatively simply.

In contrast, while the meter is not electrically powered, detection is more difficult to achieve since it is necessary to manage a power supply for a detector device incorporated in the meter.

A prior art detector device is known in which the terminal-cover and the hood are each associated with a respective switch. The open or closed states of the switches depend on the presence or the absence respectively of the terminal-cover or of the hood. The meter includes a battery, such that while the meter is not electrically powered the battery continues to power the real time clock (RTC) portion of a microcontroller. The microcontroller acts in real time to monitor the states of the switches in order to detect any opening of the terminal-cover and/or of the hood.

That solution requires functions of the microcontroller to be kept active throughout the time that the meter is not electrically powered, and thus requires a battery that is capable of supplying a large amount of energy. The cost of the battery is thus high. Furthermore, certain customers refuse to use electricity meters that include batteries.

Proposals have thus been made for the battery to be replaced by a supercapacitor of high capacitance (typically 1 farad (F)) so as to be capable of keeping these functions active while the meter is not electrically powered, typically for a duration of 5 to 7 days. Nevertheless, a supercapacitor also presents a cost that is significant, and once again this cost is associated with the high charge-storage capacity that is required for this application.

In both situations (battery and supercapacitor), the lifetime of the detection function is not very long, and the meter ceases to be able to detect any opening of the terminal-cover and/or of the hood after not being electrically powered for only a few days.

OBJECT OF THE INVENTION

An object of the invention is to detect fraudulent opening of a housing element of a meter that takes place while the meter is not electrically powered, with detection being performed in a manner that is simple and inexpensive, without using a battery, and that continues to be effective even after the meter has not been electrically powered for a long period.

SUMMARY OF THE INVENTION

In order to achieve this object, there is provided an electricity meter comprising:
  a housing including at least one housing element that is normally closed in operation, but that is capable of being opened;
  a supercapacitor;
  a power supply circuit arranged to act, whenever the electricity meter is put into connection with electric power, to charge the supercapacitor;
  a charge-maintaining circuit arranged to act, whenever the electricity meter is taken out of connection with electric power after previously being in connection with electric power, to prevent the supercapacitor from discharging so long as the housing element remains closed;
  a discharge circuit arranged to act, whenever said electricity meter has been taken out of connection with electric power, to discharge the supercapacitor in the event that the housing element is opened;
  a processor circuit arranged to act, whenever the electricity meter is put back into connection with electric power after being taken out of connection with electric power, to acquire a detection signal representative of the voltage across the terminals of the supercapacitor and thus representative of the level of charge of the supercapacitor, and if the supercapacitor is discharged, to detect that the housing element has been opened since the electricity meter was taken out of connection with electric power.

The power supply circuit thus charges the supercapacitor while the meter is electrically powered.

Thereafter, whenever the meter has been taken out of connection with electric power, the supercapacitor is discharged quickly by the discharge circuit in the event of the housing element being opened. In contrast, and by means of the circuit of the invention, so long as the housing element remains closed, the supercapacitor discharges only very slowly, as a function of its intrinsic leakage current characteristics.

The detection function does not require a battery. Since the supercapacitor does not power any component (neither a microcontroller nor any other system for recording events), and since there is no discharge path other than the path established voluntarily by opening the housing element, the detection function remains operational even after the meter has not been electrically powered for a very long time (up to several months). The supercapacitor may be of smaller dimensions than in the prior art solutions, so the invention implemented in inexpensive manner.

There is also provided an electricity meter as described above, wherein the discharge circuit comprises at least one switch connected in parallel with the supercapacitor, the switch being arranged to co-operate with the housing element in such a manner that, while the housing element is closed, the switch is open, and in such a manner that, while the housing element is open, the switch is closed and causes the supercapacitor to discharge.

There is also provided an electricity meter as described above, wherein the electricity meter includes two housing elements comprising a terminal-cover and a hood, the discharge circuit having a first switch arranged to co-operate with the terminal-cover and a second switch arranged to co-operate with the hood, the first and second switches being connected in parallel both with each other and with the supercapacitor.

There is also provided an electricity meter as described above, wherein the processor circuit is connected to the charge-maintaining circuit, wherein the charge-maintaining circuit is connected to a terminal of the supercapacitor and presents a nonconductive state when the electricity meter is not electrically powered and a conductive state when the electricity meter is electrically powered, the processor circuit and the charge-maintaining circuit being arranged in such a manner that, while the electricity meter is electrically powered, the voltage across the terminals of the supercapacitor is applied to an input of the processor circuit via the charge-maintaining circuit when the supercapacitor is charged, and a voltage of 0 volts (V) is applied to said input when said supercapacitor is discharged.

There is also provided an electricity meter as described above, wherein the charge-maintaining circuit comprises two first transistors and a second transistor, the two first transistors being connected back-to-back, one of the first transistors having a terminal connected to said terminal of the supercapacitor and the other first transistor having a terminal connected to the input of the processor circuit, the second transistor being arranged to put the first transistors into a conductive state when the electricity meter is electrically powered and the supercapacitor is charged.

There is also provided an electricity meter as described above, wherein the first transistors are P channel MOSFET type transistors and the second transistor is an N channel MOSFET type transistor, the grid of the second transistor being connected to the power supply circuit, the source of the second transistor being connected to electrical ground, and the drain of the second transistor be connected to the grids of the first transistors.

There is also provided a detection method that is performed in the processor circuit of an electricity meter as described above, and including a detection stage comprising steps that are performed whenever the electricity meter is put back into connection with electric power after being taken out of connection with electric power, said steps comprising acquiring a detection signal representative of the voltage across the terminals of the supercapacitor and thus representative of the level of charge of the supercapacitor, and if the supercapacitor is discharged, of detecting that the housing element has been opened since the electricity meter was out of connection with electric power.

There is also provided a detection method as described above, wherein a semaphore is defined by a computer program executed in the processor circuit, the semaphore having a first predefined value at the end of manufacturing the electricity meter, the detection method further comprising the steps that are performed each time the electricity meter is put into connection with electric power, said steps comprising:

reading the value of the semaphore; and:
if the value of the semaphore is equal to the first predefined value, waiting for a predefined duration, and then giving in definitive manner a second predefined value to the semaphore;
if the value of the semaphore is equal to the second predefined value, performing the detection stage.

There is also provided a detection method as described above, further comprising the steps, in the event that the processor circuit has detected that the housing element has been opened since the electricity meter was taken out of connection with electric power, of generating and sending an alarm message.

There is also provided a computer program including instructions that cause the processor circuit of the electricity meter as described above to execute the steps of the detection method as described above.

There is also provided a computer-readable storage medium, storing the above-described computer program.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
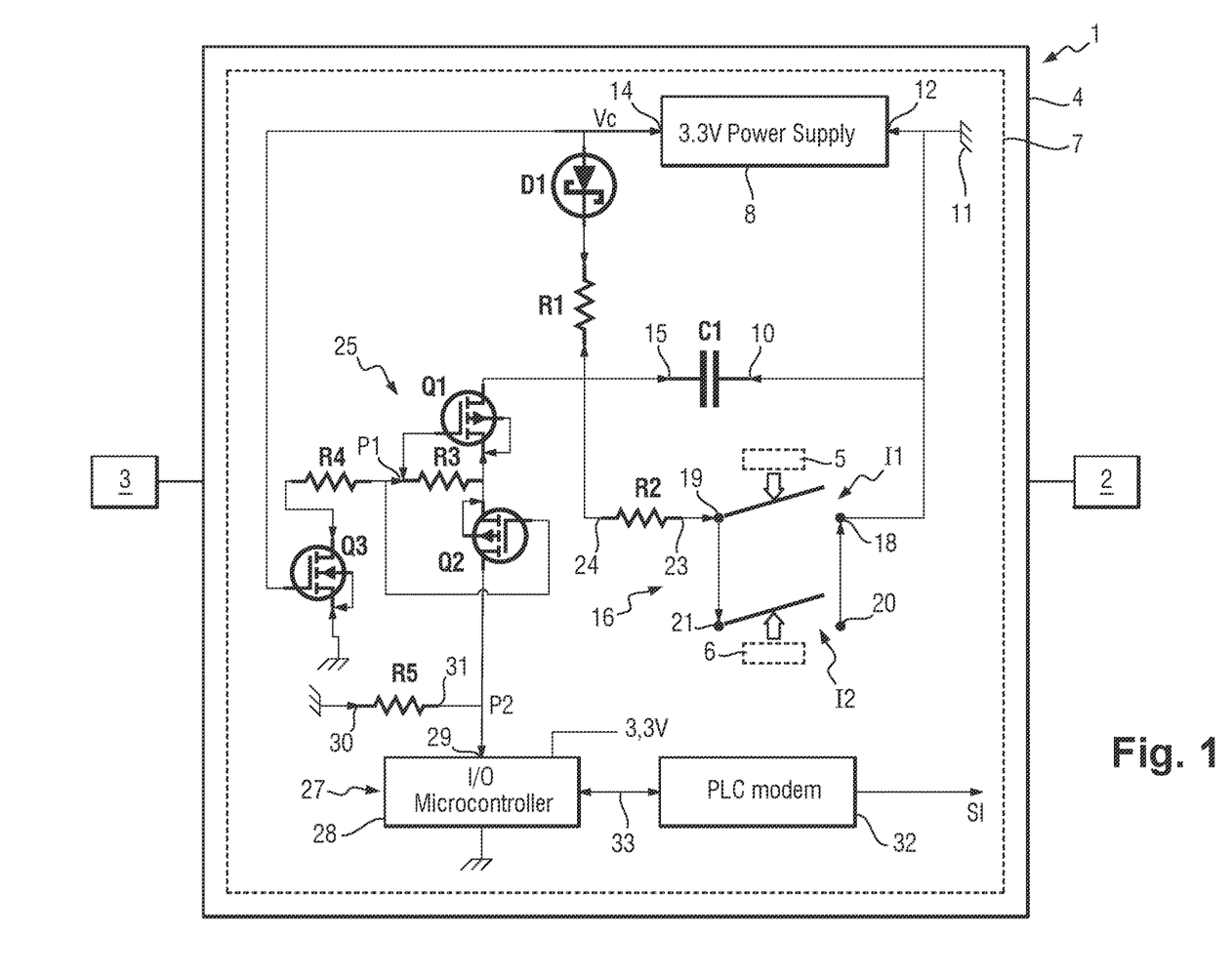
FIG. 1 shows an electricity meter of the invention.

With reference to FIG. 1, the electricity meter 1 of the invention is for measuring the consumption of energy supplied to a subscriber's electrical installation 2 by a distribution grid 3.

The meter 1 may be a meter that is single-phase or polyphase, e.g. three-phase.

The meter 1 comprises a housing 4 that contains all of the control components of the meter 1. The term "housing" is used herein to mean the physical shell that separates the inside of the meter 1 from the outside.

The housing 4 includes at least one housing element that is normally closed in operation, but that is capable of being opened. The housing element may potentially be removable, but it may equally well be permanently attached to the remainder of the housing 4 when it is opened.

In this example, the housing 4 has two housing elements, specifically a terminal-cover 5 and a hood 6, both of which are removable.

The meter 1 includes a detector device 7 that serves to detect opening of the terminal-cover 5 and/or of the hood 6 while the meter 1 is not electrically powered, and to do so even after the meter 1 has not been electrically powered for a long time (typically 3 months or longer). The detector device 7 thus serves to identify fraud attempts and to warn the IS in the event that such an attempt occurs, so as to enable the operator to take measures regarding the identified fraud attempt.

The detector device 7 comprises firstly a supercapacitor C1 and a power supply circuit. The power supply circuit comprises a power supply component 8 connected in parallel with the supercapacitor C1.

The supercapacitor C1 has a first terminal 10 connected to the electrical ground 11 of the meter 1. The power supply component 8 has a port 12 connected to electrical ground 11. The power supply component 8 also has an output 14 connected to a second terminal 15 of the supercapacitor C1 via a Schottky diode D1 and a resistor R1. The power supply component 8 is powered solely while the meter 1 is electrically powered, in which case it produces a direct current (DC) voltage Vc on its output 14, specifically a voltage equal to 3.3 volts (V).

Thus, while the power supply component 8 is itself powered, it charges the supercapacitor C1.

The detector device 7 also includes a discharge circuit 16 that is arranged, while the meter 1 is not electrically powered, to discharge the supercapacitor C1 in the event that the terminal-cover 5 is opened, or the hood 6 is opened, or both of them are opened.

The discharge circuit 16 comprises at least one switch connected in parallel with the supercapacitor C1, the switch being arranged to co-operate with the housing element in such a manner that, while the housing element is closed, the switch is open, and in such a manner that, while the housing element is open, the switch is closed and causes the supercapacitor C1 to discharge. In this example, there are two housing elements, and the discharge circuit 16 has a first switch I1 arranged to co-operate with the terminal-cover 5 and a second switch I2 arranged to co-operate with the hood 6, the first and second switches I1 and I2 being connected in parallel both with each other and with the supercapacitor C1.

The first switch I1 has a first terminal 18 and a second terminal 19. The second switch I2 has a first terminal 20 and a second terminal 21. The first terminals 18 and 20 are connected to each other and to electrical ground 11. The second terminals 19 and 21 are connected together and to the first terminal 23 of a resistor R2, having its second terminal 24 connected to the second terminal 15 of the supercapacitor C1.

The first switch I1 co-operates with the terminal-cover 5 as follows. By its very design, the first switch I1 is a switch that is "normally closed". A peg that is secured to the terminal-cover 5 bears against the first switch I1 while the terminal-cover 5 is closed and therefore mounted on the housing 4 of the meter 1, thereby opening the first switch I1. The first switch I1 is thus in the open state when the meter 1 is functioning under normal conditions of operation (terminal-cover 5 closed). In contrast, when the terminal-cover 5 is opened, the peg no longer faces the first switch I1, which then switches to the closed state (conductive).

The second switch I2 co-operates with the hood 6 in the same manner.

When the terminal-cover 5 is opened, the first switch I1 is closed, thereby causing the supercapacitor C1 to discharge. Likewise, when the hood 6 is opened, the second switch I2 is closed, thereby causing the supercapacitor C1 to discharge.

The detector device 7 also comprises a charge-maintaining circuit 25 that is arranged, whenever the meter 1 is taken out of connection with electric power, to prevent the supercapacitor C1 from discharging so long as the terminal-cover 5 and the hood 6 remain closed, i.e. so long as the first switch I1 and the second switch I2 both remain in the open state.

The charge-maintaining circuit 25 is connected to the second terminal 15 of the supercapacitor C1 and it presents a non-conductive state while the meter 1 is not electrically powered or while the meter 1 is electrically powered and the supercapacitor C1 is discharged, and a conductive state while the meter 1 is electrically powered and the supercapacitor C1 is charged.

The charge-maintaining circuit 25 has two first transistors Q1 and Q2, a second transistor Q3, a resistor R3, and a resistor R4.

The two first transistors are P-channel MOSFET type transistors, and they are connected back-to-back: they are thus connected in series, with the source of the first transistor Q1 being connected to the source of the first transistor Q2. The grids of the first transistors Q1 and Q2 are connected together at a point P1, which point is itself connected to the sources of the first transistors Q1 and Q2 via the resistor R3. By way of example, the resistor R3 may have a resistance of 10 kilohms (kΩ).

The drain of the first transistor Q1 is connected to the second terminal 15 of the supercapacitor C1.

The second transistor Q3 is an N-channel MOSFET type transistor having its grid connected to the output 14 of the power supply component 8, its source connected to electrical ground 11, and its drain connected via the resistor R4 to the point P1 (and thus to the grids of the first transistors Q1 and Q2). By way of example, the resistor R4 may have a resistance of 1 kΩ.

The charge-maintaining circuit 25 also includes the above-mentioned Schottky diode D1.

The detector circuit 7 also includes a processor circuit 27 that is connected to the charge-maintaining circuit 25. By way of example, the processor component 27 comprises a processor component, which may be a general-purpose processor, a processor specialized in signal processing (known as a digital signal processor (DSP)), a microcontroller, or indeed a programmable logic circuit such as a field programmable gate array (FPGA) or an application-specific integrated circuit (ASIC). The processor circuit 27 also comprises one or more memories, connected to or incorporated in the processor component. At least one of these memories constitutes a computer-readable storage medium, storing a computer program including instructions that enable the processor component to execute at least some of the steps of the detection method is described below.

In this example, the meter 1 presents a two-microcontroller architecture: a metrological microcontroller that forms part of a metrological portion of the meter 1, and an application microcontroller that forms part of an application portion of the meter 1.

In this example, the processor component is the application microcontroller 28.

The microcontroller 28 is powered by the power supply component 8 at 3.3 V and it is connected to electrical ground 11.

The microcontroller 28 has an input 29 connected to the drain of the first transistor Q2. The input 29 is an input/output (I/O) that is configured in input (I) mode.

A resistor R5 is connected so as to have a first terminal 30 that is connected to electrical ground 11 and a second terminal 31 connected to a point P2, which point is itself connected to the drain of the first transistor Q2 and to the input 29 of the microcontroller 28. While the meter 1 is electrically powered and the supercapacitor C1 is discharged, this enables a voltage of 0 V to be presented to the input 29 of the microcontroller 28.

The meter 1 also includes a communication module, which is specifically a powerline communication (PLC) modem 32. The PCL modem 32 uses the G3 PLC standard, but some other type of standard could be used, e.g. the PLC Prime standard.

The microcontroller 28 and the PLC modem 32 are connected together by a serial link 33, which in this example makes use of the universal asynchronous receiver/transmitter (UART) protocol. It would naturally be possible to use some other type of link, for example a serial peripheral interface (SPI) link.

The operation of the detector device 7 of the meter 1 is described below in greater detail.

Each time the meter 1 is put into connection with electric power, the power supply component 8 is likewise put into connection with electric power, and it charges the supercapacitor C1. The maximum voltage Umax across the terminals of the supercapacitor C1 is equal to 3.3 V (i.e. to Vc).

The time T1 for charging the supercapacitor C1 to 63% (the time to go from 0% to 63% of Umax) is equal to:

$$T1=R1*C1.$$

By way of example, the following values may be used for R1 and C1:

$$R1=1200 \text{ ohms } (\Omega) \text{ and } C1=0.1 \text{ } F.$$

Thus:

$$T1=120 \text{ } s=2 \text{ minutes}.$$

The time for charging to 95% is equal to 3*T1, and thus to 360s (or 6 minutes).

Thus, as a result of the meter 1 being previously put into connection with electric power, the power supply component 8 is likewise put into connection with electric power, and it charges the supercapacitor C1. The term "previously put into connection with electric power" covers any occasion when the meter 1 is put into connection with electric power during its lifetime.

When the meter 1 is taken out of connection with electric power (after previously being put into connection with electric power initially), the power supply component 8 is no longer powered.

The charge-maintaining circuit 25 serves to prevent the supercapacitor C1 from discharging, and this continues so long as the terminal-cover 5 and the hood 6 remain closed.

Specifically, while the power supply component 8 is not powered, the voltage on the grid of the second transistor Q3 is zero, and the second transistor Q3 is thus in a nonconductive state. The internal diodes of the two first transistors Q1 and Q2 prevent current from passing from the supercapacitor C1 to the input 29 of the microcontroller 28 (and also in the opposite direction), since they are connected back-to-back. The supercapacitor C1 therefore does not discharge to electrical ground 11 via the microcontroller 28.

Simultaneously, while the meter is not electrically powered, the Schottky diode D1 serves to prevent the supercapacitor C1 from discharging via a path going through the resistor R1 and the power supply component 8 to electrical ground 11.

Whenever the meter 1 has been taken out of connection with electric power, and in the event that the terminal-cover 5 is opened and/or the hood 6 is opened, the first and/or the second switch I1 and/or I2 switch(es) to a closed state. The two plates of the supercapacitor C1 are then connected together via the resistor R2, and the supercapacitor C1 discharges quickly.

The time T2 for discharging the supercapacitor C1 to 37% (the time to go from 100% to 37% of Umax) is equal to:

$$T2=R2*C2.$$

By way of example, the following values may be used for R2:

$$R2=10\Omega.$$

Thus:

$$T2=1 \text{ } s.$$

The time for discharging to 95% is equal to 3*T2, and thus to 3 s.

The supercapacitor C1 is thus discharged in the event of one or the other of the two switches I1 or I2 being in the closed state, even if that state lasts for only 3 seconds.

Thereafter, once the meter 1 is put back into connection with electric power, the microcontroller 28 acquires a detection signal representative of the voltage across the terminals of the supercapacitor C1 and thus of the level of charge in the supercapacitor C1, and in the event that the supercapacitor C1 is discharged it detects that the terminal-cover 5 or the hood 6 (or both of them) has been opened since the meter 1 was taken out of connection with electric power.

The term "put back into connection with electric power" refers being put into electric power after being taken out of connection with electric power, and specifically to being put back into connection directly after the meter being previously put into connection with electric power.

When the meter 1 is electrically powered, and while the supercapacitor C1 is charged, the voltage across the terminals of the supercapacitor C1 is applied to the input 29 of the microcontroller 28 via the charge-maintaining circuit 25. In this example, the detection signal is thus the voltage across the terminals of the supercapacitor C1 itself (but it could be some other signal derived from that voltage).

Specifically, whenever the meter 1 is electrically powered and the supercapacitor C1 is charged, the power supply component 8 is also electrically powered and produces the voltage Vc equal to 3.3 V on its output 14. The second transistor Q3 is thus in a conductive state, such that the grids of the first transistors Q1 and Q2 are connected to electrical ground 11 (via the resistor R4). Since the drain of the first transistor Q1 is at the same potential as the second terminal 15 of the supercapacitor C1, which is charged, both of the first transistors Q1 and Q2 are then in a conductive state and the second terminal 15 of the supercapacitor C1 is connected to the input 29 of the microcontroller 28.

Whenever the meter 1 is electrically powered and the supercapacitor C1 is s discharged, both of the first transistors Q1 and Q2 are in the nonconductive state and electrical ground 11 is applied (via the resistor R5) to the input 29 of the microcontroller 28.

Specifically, whenever the meter 1 is electrically powered and the supercapacitor C1 is discharged, even though the second transistor Q3 is in a conductive state so that the grids of the first transistors Q1 and Q2 are connected to electrical ground 11, since the drain of the first transistor Q1 is biased to 0 V, the first transistors Q1 and Q2 are in the nonconductive state and electrical ground 11 is applied to the input 29 of the microcontroller 28 via the resistor R5.

The microcontroller 28 then compares the voltage of its input 29 with a first predefined threshold and with a second predefined threshold.

In this example, the first predefined threshold is equal to 1.8 V and the second predefined threshold is equal to 0.8 V.

If the voltage of the input 29 is higher than the first predefined threshold, the microcontroller 28 reads a "1" state (high state), which corresponds to a normal state of charge for the supercapacitor C1, and thus to an absence of fraud.

If the voltage of the input 29 is lower than the second predefined threshold, the microcontroller 28 reads a "0" state (low state), which corresponds to an insufficient state of charge for the supercapacitor C1. The microcontroller 28 detects that one or both of the terminal-cover 5 and the hood 6 has been opened since the meter 1 was taken out of connection with electric power, and thus detects that a fraud has occurred.

Once the meter 1 has restarted, the power supply component 8 recharges the supercapacitor C1 (the charging circuit has a time constant of 2 minutes). Consequently, the reading needs to be taken quite quickly, e.g. within a few seconds of the meter 1 being restarted. In a few seconds, the charge of the supercapacitor C1 does not have long enough to change significantly.

This avoids having a significant difference in the value of the charge of the supercapacitor C1 between the meter 1 being put back into connection with electric power and the reading being taken, thereby avoiding reading a high state even though the terminal-cover 5 and/or the hood 6 has been opened ("false negative").

In the event that opening of the terminal-cover 5 or of the hood 6 is detected, the microcontroller 28 produces an alarm message and transmits it to the IS using the PLC modem 32.

After each occasion the meter is put back into connection with electric power, and even if the supercapacitor C1 has been discharged after previously being taken out of connection with electric power, it takes no more than 6 minutes to recharge the supercapacitor completely (to 95%). This implies that, even in the event of opening being detected (causing an alarm message to be sent to the IS), the supercapacitor C1 is recharged and the detector device 7 is ready once again to detect any new attempted fraud taking place after subsequently taking the meter out of connection with electric power.

It should be observed that while the microcontroller 28 is reading the voltage across the terminals of the supercapacitor C1 in the event that the supercapacitor C1 is discharged, the first transistors Q1 and Q2 then being in a nonconductive state, the resistor R5 connected to ground 11 serves to apply a zero voltage on the input of the microcontroller 28, which therefore reads a 0 state.

It can be seen that while the meter 1 is not electrically powered, none of the components of the detector circuit 7 needs to be powered. In particular, the charge-maintaining circuit 25 does not need any power to keep the supercapacitor C1 charged, and the energy stored in the supercapacitor C1 is not used for powering any components. Furthermore, the charge-maintaining circuit 25 serves to prevent the supercapacitor C1 from discharging. Consequently, the supercapacitor C1 discharges very slowly while the meter 1 is not electrically powered, such that fraud detection remains operational for a long time after the meter has been taken out of connection with electric power, and such that it is possible to select a supercapacitor C1 of relatively small capacitance.

There follows a description of a detection stage as performed by the microcontroller 28, which stage thus takes place after the meter 1 has been put back into connection with electric power after previously being in connection with electric power and then taken out of connection with electric power, and consists in reading a detection signal representative of the voltage across the terminals of the supercapacitor C1 and, in the event of the supercapacitor C1 being discharged, indicating that one or both of the terminal-cover 5 and the hood 6 has been opened since the meter 1 was taken out of connection with electric power.

It is preferable not to test the voltage level across the terminals of the supercapacitor C1 when the meter 1 is put into connection with electric power for the first time, as occurs immediately after the meter 1 is installed on the customer's premises. The supercapacitor C1 can be expected a priori to be discharge when it is put into connection with electric power for the first time, when it is still not possible for any fraudulent manipulation to have taken place.

For this purpose, the meter 1 uses a semaphore, which is a variable defined by a computer program performed in the microcontroller 28.

Once the meter 1 has been manufactured, i.e. on leaving the factory, a first predefined value is given to the semaphore: S1=0.

Figure 2:
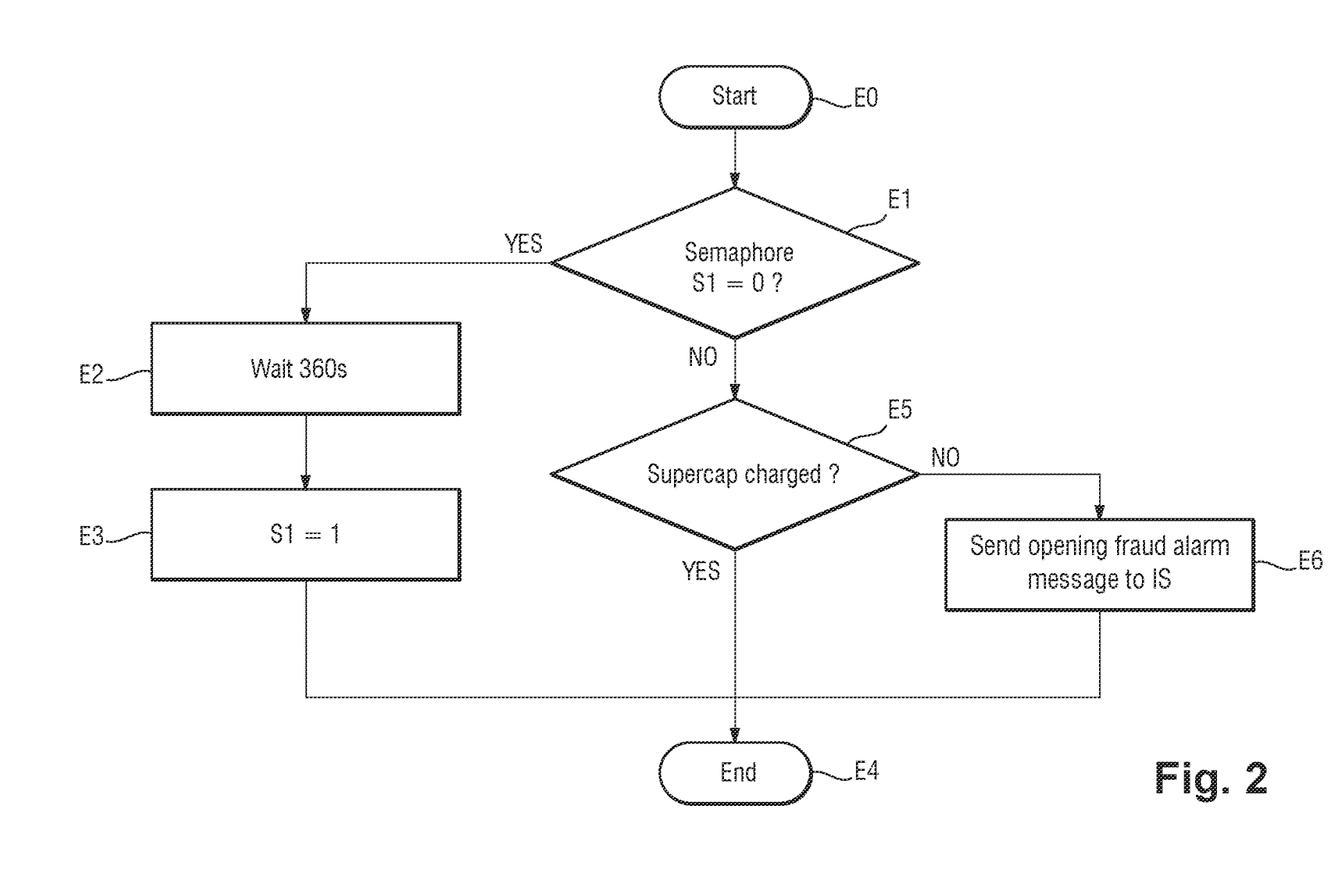
FIG. 2 shows steps in a detection method performed by the meter.

With reference to FIG. 2, each time the meter 1 is into connection with electric power (including put initially), the microcontroller 28 performs the following detection method.

The detection method starts at step E0. The microcontroller 28 then reads the value of the semaphore verifies whether S1=0 (step E1).

If so, the microcontroller 28 knows that the meter is being put into connection with electric power for the first time.

The microcontroller 28 therefore does not detect whether the terminal-cover 5 or the hood 6 has been opened and therefore does not detect whether fraud has taken place, but instead it waits for a predefined duration D (step E2).

The predefined duration D corresponds to a length of time that is long enough for the charge of the supercapacitor C1 reach a sufficient level.

In this example, the sufficient level is equal to 95%. Thus:

$$D=3*T1=3*R1*C1=6 \text{ minutes.}$$

At the end of the predefined duration D, the microcontroller 28 imparts, in a definitive manner, a second predefined value to the semaphore: S1=1 (step E3). The detection method comes to an end (step E4).

In step E1, if the value of the semaphore is equal to the second predefined value (i.e. if S1=1), the microcontroller 28 knows that the meter is not being put into connection with electric power for the first time. The microcontroller 28 then performs the detection stage and it reads the detection signal representative of the voltage across the terminals of the supercapacitor C1 (i.e. specifically the voltage across the terminals of the supercapacitor C1 itself). The microcontroller 28 thus verifies whether the supercapacitor C1 is charged (step E5).

If the supercapacitor C1 is still charged, then the detection method comes to an end (step E4). Otherwise, the microcontroller 28 produces an alarm message and sends it to the IS via the PLC modem 32 in order to warn that there has been fraudulent opening of the terminal-cover 5 and/or of the hood 6. The detection method comes to an end.

Naturally, the invention is not limited to the implementation described but covers any variant coming within the ambit of the invention as defined by the claims.

The values of the components used could naturally be different from those described above. Likewise, the charging and discharging times for the supercapacitor could be different.

The components used could be different from those described above.

In the charge-maintaining circuit, it is possible to use different transistors, and/or to connect the transistors in a different configuration. The first transistors could be of N channel MOSFET type and the second transistor could be of P channel MOSFET type. The transistors need not necessarily be MOSFETS. The number of transistors used could be different.

The microcontroller that reads the voltage across the terminals of the supercapacitor need not necessarily be the application microcontroller, and for example, in a two-microcontroller architecture, it could be the metrological microcontroller. Under such circumstances, it should be observed that the PLC modem is preferably connected to the application microcontroller.

Some other component could be used for reading the voltage across the terminals of the supercapacitor. For example, it would be possible to connect one terminal of the supercapacitor the input of an analog-to-digital converter (possibly incorporated in the microcontroller). Instead of reading a "binary" detection signal presenting a high state or low state, that would make it possible to measure the level of the voltage across the terminals of the supercapacitor. By way of example, such a measurement could be used for monitoring the maximum charge of the supercapacitor, and thus for monitoring its ageing.

The communication module need not necessarily be a PLC modem. The alarm message may be transmitted by any existing communication means, whether wired or wireless. It is thus possible to use cellular communication, e.g. in compliance with the long-term evolution machine type communication (LTE-M) standard or with the narrow band internet of things (NB-IoT) standard.

It is also possible to use a plurality of supercapacitors, e.g. connected in parallel.

The invention claimed is:

1. An electricity meter comprising:
a housing including at least one housing element that is normally closed in operation, but that is capable of being opened;
a supercapacitor;
a power supply circuit arranged to act, whenever the electricity meter is put into connection with electric power, to charge the supercapacitor;
a charge-maintaining circuit arranged, to act whenever the electricity meter is taken out of connection with electric power after previously being in connection with electric power, to prevent the supercapacitor from discharging so long as the housing element remains closed;
a discharge circuit arranged to act, whenever said electricity meter has been taken out of connection with electric power, to discharge the supercapacitor in the event that the housing element is opened; and
a processor circuit arranged to act, whenever the electricity meter is put back into connection with electric power after being taken out of connection with electric power, to acquire a detection signal representative of the voltage across the terminals of the supercapacitor and thus representative of the level of charge of the supercapacitor, and if the supercapacitor is discharged, to detect that the housing element has been opened since the electricity meter was taken out of connection with electric power;
wherein the charge-maintaining circuit comprises two first transistors and a second transistor, the two first transistors being connected back-to-back, one of the first transistors having a terminal connected to a terminal of the supercapacitor and the other first transistor having a terminal connected to an input of the processor circuit, the second transistor being arranged to put the first transistors into a conductive state when the electricity meter is electrically powered and the supercapacitor is charged.

2. The electricity meter according to claim 1, wherein the discharge circuit comprises at least one switch connected in parallel with the supercapacitor, the switch being arranged to co-operate with the housing element in such a manner that, while the housing element is closed, the switch is open, and in such a manner that, while the housing element is open, the switch is closed and causes the supercapacitor to discharge.

3. The electricity meter according to claim 2, wherein the electricity meter includes two housing elements comprising a terminal-cover and a hood, the discharge circuit having a first switch arranged to co-operate with the terminal-cover and a second switch arranged to co-operate with the hood, the first and second switches being connected in parallel both with each other and with the supercapacitor.

4. The electricity meter according to claim 1, wherein the processor circuit is connected to the charge-maintaining circuit, wherein the charge-maintaining circuit is connected to said terminal of the supercapacitor and presents a non-conductive state when the electricity meter is not electrically powered and a conductive state when the electricity meter is electrically powered, the processor circuit and the charge-maintaining circuit being arranged in such a manner that, while the electricity meter is electrically powered, the voltage across the terminals of the supercapacitor is applied to said input of the processor circuit via the charge-maintaining circuit when the supercapacitor is charged, and a voltage of 0 V is applied to said input when said supercapacitor is discharged.

5. The electricity meter according to claim 1, wherein the first transistors are P channel MOSFET type transistors and the second transistor is an N channel MOSFET type transistor, a grid of the second transistor being connected to the power supply circuit, a source of the second transistor being connected to electrical ground, and a drain of the second transistor be connected to the grids of the first transistors.

6. A detection method performed in the processor component of an electricity meter according to claim 1, and including a detection stage comprising steps that are performed whenever the electricity meter is put back into connection with electric power after being taken out of connection with electric power, said steps comprising acquiring a detection signal representative of the voltage across the terminals of the supercapacitor and thus representative of a level of charge of the supercapacitor, and in the event that the supercapacitor is discharged, of detecting that the housing element has been opened since the electricity meter was taken out of connection with electric power.

7. The detection method according to claim 6, wherein a semaphore is defined by a computer program executed in the processor circuit, the semaphore having a first predefined value at the end of manufacturing the electricity meter, the detection method further comprising the steps that are performed each time the electricity meter is put into connection with electric power, said steps comprising:
reading the value of the semaphore; and:
if the value of the semaphore is equal to the first predefined value, waiting for a predefined duration, and then giving in definitive manner a second predefined value to the semaphore;
if the value of the semaphore is equal to the second predefined value, performing the detection stage.

8. The detection method according to claim 6, further comprising the steps, in the event that the processor circuit has detected that the housing element has been opened since the electricity meter was taken out of connection with electric power, of generating and sending an alarm message.

9. A computer-readable storage medium storing a computer program including instructions that cause the processor component of the electricity meter according to claim 1 to execute a detection method performed in the processor component of the electricity meter, the detection method including a detection stage comprising steps that are performed whenever the electricity meter is put back into connection with electric power after being taken out of connection with electric power, said steps comprising acquiring a detection signal representative of the voltage across the terminals of the supercapacitor and thus representative of a level of charge of the supercapacitor, and in the event that the supercapacitor is discharged, of detecting that the housing element has been opened since the electricity meter was taken out of connection with electric power.

* * * * *